United States Patent [19]
Wood

[11] 4,171,876
[45] Oct. 23, 1979

[54] APPARATUS FOR SUPPORTING LARGE-DIMENSION CURVED REFLECTORS

[76] Inventor: Douglas E. Wood, Box 32, Fox Island, Wash. 98333

[21] Appl. No.: 842,743

[22] Filed: Oct. 17, 1977

[51] Int. Cl.² .............................................. G02B 5/10
[52] U.S. Cl. .................................. 350/292; 126/424; 126/438; 350/293
[58] Field of Search ................. 350/292, 293; 126/270, 126/271; 353/3; 343/840, 912, 915

[56] References Cited

U.S. PATENT DOCUMENTS

| 3,618,111 | 11/1971 | Vaughan | 343/840 |
| 3,998,206 | 12/1976 | Jahn | 126/271 |

OTHER PUBLICATIONS

Fager et al., IEEE Transactions on Antennas and Propagation, vol. AP-17, No. 4, Jul. 1969, pp. 452-458.

Primary Examiner—F. L. Evans
Attorney, Agent, or Firm—Cole, Jensen & Puntigam

[57] ABSTRACT

The reflector support structure includes a plurality of substantially straight rod-like elements which are secured together at their respective ends, forming joints, in such an arrangement so as to describe a generally paraboloidal shape comprised of a plurality of open triangles. Elongated standoff elements extend outwardly from at least the joints of the reflector support structure and have secured thereto positioning elements for supporting the apexes of triangular-shaped relfecting sections. A plurality of reflecting sections are arranged to substantially mate along their respective edges, and are held in place by the supporting elements, to form a large, substantially parabolic, reflector. When the reflector and reflector support structure are used as part of a solar collection system, a tracking support structure supports the reflector support structure off the ground and in a correct orientation relative to the sun.

13 Claims, 8 Drawing Figures

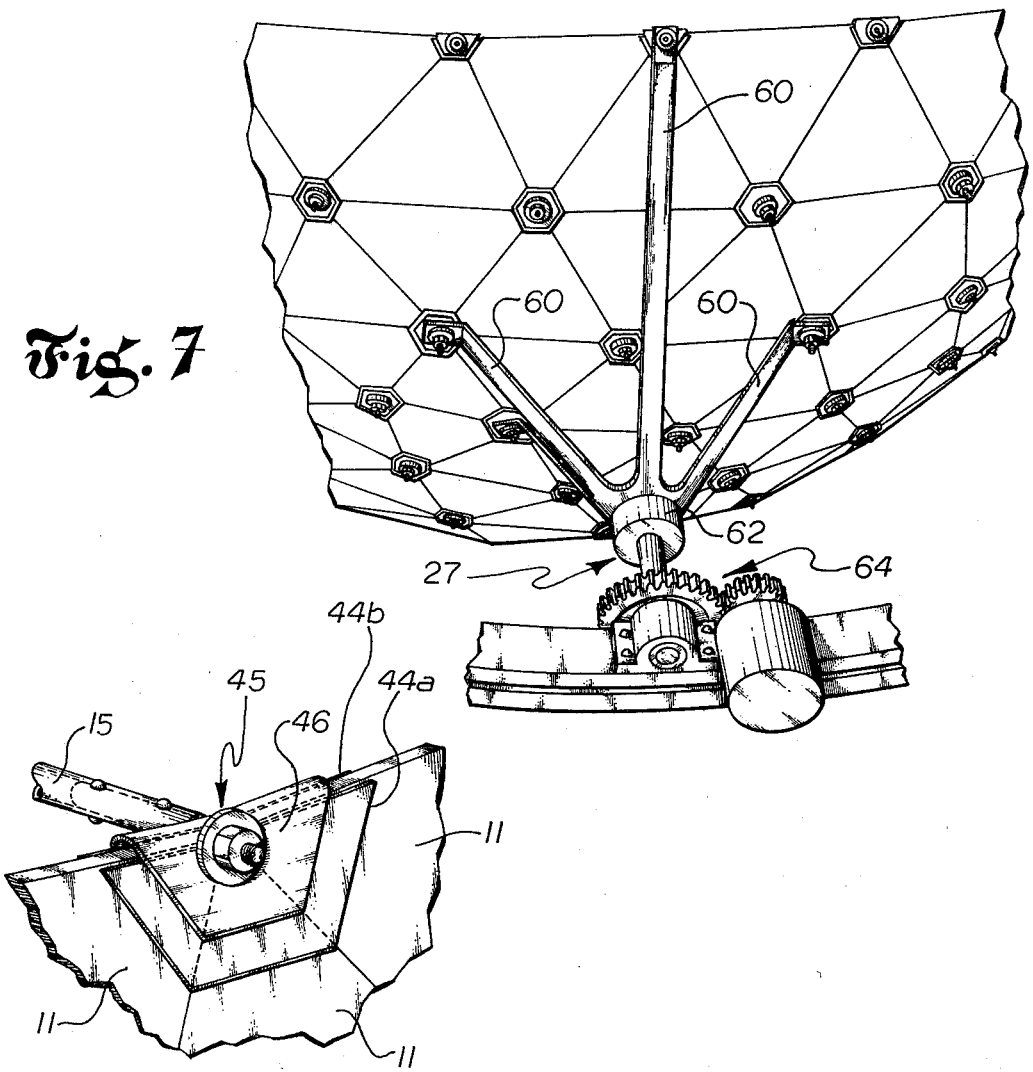

APPARATUS FOR SUPPORTING LARGE-DIMENSION CURVED REFLECTORS

BACKGROUND OF THE INVENTION

The present invention is directed toward the art of support structures for parabolic reflectors, and more particularly concerns a support structure for a large parabolic reflector which is intended primarily for use as a solar reflector and which is comprised of a large number of small reflecting sections arranged into a paraboloid.

Large dimension parabolic reflectors, on the order of twenty feet in diameter and larger, have historically been proposed for use in a variety of applications, including use in a solar collection system. However, large dimension parabolic reflectors have always been difficult and expensive to manufacture and hence are presently considered impractical, except perhaps in special purpose applications, such as large telescopes.

In addition to the cost involved in producing such a parabolic reflector per se, the support structure for such reflectors also is complicated and expensive. Additionally, the support structure must be designed for the particular reflector application, and a support structure suitable for one application would not necessarily be suitable for any other reflector applications.

For instance, those support structures which have been developed for parabolic reflector telescopes are not suitable for solar collector applications, wherein the reflective surface must be as open as possible to the sun, and wherein the support structure must be capable of withstanding harsh weather environments, including high winds and hail, without damage to either the support structure or the reflector.

Other large-dimension curved structures besides parabolas have been constructed using a plurality of relatively small size plane sections of various forms. An example of using relatively small sections to construct a spherical structure is shown in U.S. Pat. No. 2,978,704, titled: Random Structural Devices. As suggested herein, large dimension parabolic reflectors can also be constructed with small-size sections, at considerable cost savings over a single surface reflector.

Although such a construction technique may significantly reduce the cost of producing a parabolic reflector per se, the problems of adequately supporting and protecting that structure, especially under extreme weather conditions, remain. To the best of the inventor's knowledge, there is very little information available concerning support structures for large-dimension parabolic reflectors intended for outdoor use, especially where the reflector comprises a plurality of relatively small sections and is intended for use as a solar collector.

Necessarily, such a support structure must have the proper strength in order to support the plurality of reflecting sections without breakage during normal operation, and must be capable of protecting the reflecting sections in weather extremes. It must further interfere only minimally, if at all, with the amount of sun reaching the reflecting surfaces of the individual sections.

Additionally, such a support structure should be relatively inexpensive, so that the combined support structure-parabolic reflector may be economically practical as a solar collector. Further, the support structure should be relatively simple and inexpensive to install on site, and must be capable of accurately tracking the sun in its movement across the sky.

Accordingly, it is a general object of the present invention to provide a support structure for a parabolic reflector which overcomes one or more of the disadvantages of the prior art noted above.

It is another object of the present invention to provide such an apparatus which is relatively simple to install on site.

It is a further object of the present invention to provide such an apparatus which is capable of withstanding the stresses of weather extremes.

It is another object of the present invention to provide such an apparatus which is capable of supporting a parabolic reflector without counterweights.

It is an additional object of the present invention to provide such an apparatus which is capable of supporting a large-dimension parabolic reflector comprised of a plurality of relatively small-size reflecting sections.

It is yet another object of the present invention to provide such an apparatus which is capable of supporting a multiple-section parabolic reflector over an extended period of time without damaging the individual sections.

It is a still further object of the present invention to provide such an apparatus which permits the individual sections comprising the parabolic reflector to be separately focused.

It is another object of the present invention to provide such an apparatus which is capable of tracking the sun with the parabolic reflector.

SUMMARY OF THE INVENTION

Accordingly, there is provided with a special-purpose support structure for supporting large-dimension reflectors which exhibit a curved surface, such as a parabolic reflector. The support structure includes a first rigid support matrix which comprises a plurality of strut-like members which are joined together at matrix joints in such a manner that the first rigid support matrix approximates the curved shape of the large-dimension reflector which it is to support. A plurality of standoff elements are provided in the support structure, with the standoff elements being connected to the matrix joints and extending away therefrom. Additionally, there are securing member mounted on each of the standoff elements for securing the curved reflector in position away from the first rigid support matrix.

DESCRIPTION OF THE DRAWINGS

A more thorough understanding of the invention may be obtained by a study of the following detailed description taken in connection with the accompanying drawings in which:

FIG. 7 is a perspective view showing the axis structure between the support structure for the parabolic reflector and apparatus for tracking the sun.

FIG. 8 is a perspective view showing the structure for securing the individual reflecting sections in place to form a parabolic reflector.

DESCRIPTION OF THE PREFERRED EMBODIMENT

Figure 1:
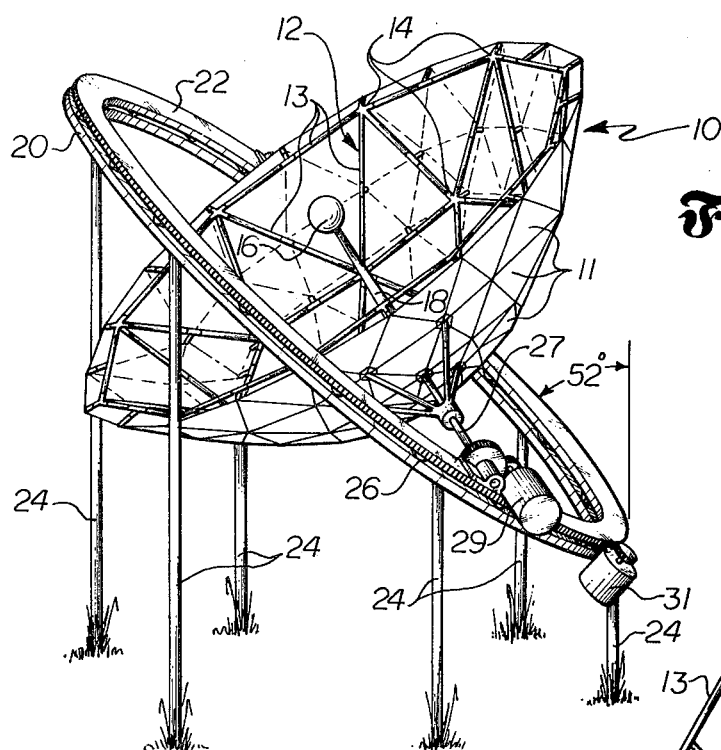
FIG. 1 is a diagram showing the principal components of a solar collection system, including the support apparatus of the present invention.

Referring now to FIG. 1, the reflector support structure of the present invention is shown in the context of a complete solar energy collection system. A parabolic reflector is shown generally at 10, and is comprised of a plurality of triangular sections 11—11 of conventional mirrored glass. Triangular sections 11—11 may be plane or slightly curved or dished. Triangular sections 11—11 are arranged and positioned such that their respective apex points lie on the surface of a true parabola. Reflector 10 thus is substantially parabolic.

In the embodiment shown in FIG. 1, a first reflector support matrix, also of generally parabolic configuration, shown generally at 12, is provided inside parabolic reflector 10. Reflector support matrix 12 comprises a plurality of elongated rod-like elements 13—13 which are joined together at their ends, at joints 14—14, to form a plurality of intersecting open triangles in a generally parabolic arrangement. The joints 14—14, in the configuration shown, lie substantially on the surface of a true imaginary parabola.

Extending outwardly from each joint 14, and fixedly connected thereto, is an elongated standoff element 15 which has located therealong positioning elements (not shown in FIG. 1) which may be moved longitudinally along standoff elements 15, and which hold triangular sections 11—11 at their apexes in a parabolic arrangement 10.

In FIG. 1, four triangular sections 11—11 are shown for each triangular portion of support matrix. This is shown most clearly in FIG. 3. In an even more simple embodiment, the triangular sections 11—11 could be the same size as the triangular support matrix portions. A more complicated embodiment, using two support matrixes, wherein 16 triangular sections 11—11 are used for each triangular portion of the first support matrix is shown in FIGS. 4 and 5.

A boiler 16 of conventional design and of a size which is commensurate with parabolic reflector 10, is located substantially at the focal point of parabolic reflector 10 and parabolic support matrix 12. An elongated support element 18 connects boiler 16 and the back center of the parabolic support matrix 12, and supports boiler 16 at the focal point thereof. The boiler 16 may take various configurations, and may be a mercury heat exchanger. An example of a boiler which may be useful is described in U.S. Pat. No. 4,019,868, issued to Sebacher, et al, on Apr. 26, 1977 and titled: Solar Hydrogen Generator.

Encircling parabolic reflector 10 and parabolic support matrix 12 is a terrain support apparatus which includes first and second support rings 20 and 22. The first support ring 20 is stationary and is supported off the ground at a selected angular orientation to the terrain by a plurality of upright posts 24—24. The second support ring 22, which is of substantially the same configuration and size as the first support ring 20, is positioned on top of the first support ring and rotates relative to the first support ring by means of rollers or similar conventional devices 26 through a motor 31.

Parabolic reflector 10 and parabolic support matrix 12 are secured to an axis structure 27 which is in turn rotatably connected to second support ring 22 through conventional means, such as a motor-driven gear arrangement 29. This arrangement permits parabolic reflector 10 to be rotated within support rings 20 and 22.

In operation, second support ring 22 is rotated relative to first support ring 20 at specified time intervals to maintain the correct reflector azimuth for the parabolic reflector 10, while parabolic reflector 10 itself is periodically rotated, through axis structure 27, to maintain a correct reflector altitude. Hence, parabolic reflector 10 follows the path of the sun as it moves from horizon to horizon.

The sun's rays, when they strike the inside reflecting surface of parabolic reflector 10, are focussed by the individual triangular sections 11—11 to the boiler 16. The boiling medium in boiler 16 is raised to a temperature between 600° F. and 1000° F. when plane triangular sections are used, and between 3000° F. and 6000° F., when curved triangular sections are used, resulting in superheated steam which can then be utilized to drive conventional steam generators or similar means.

Figure 2:
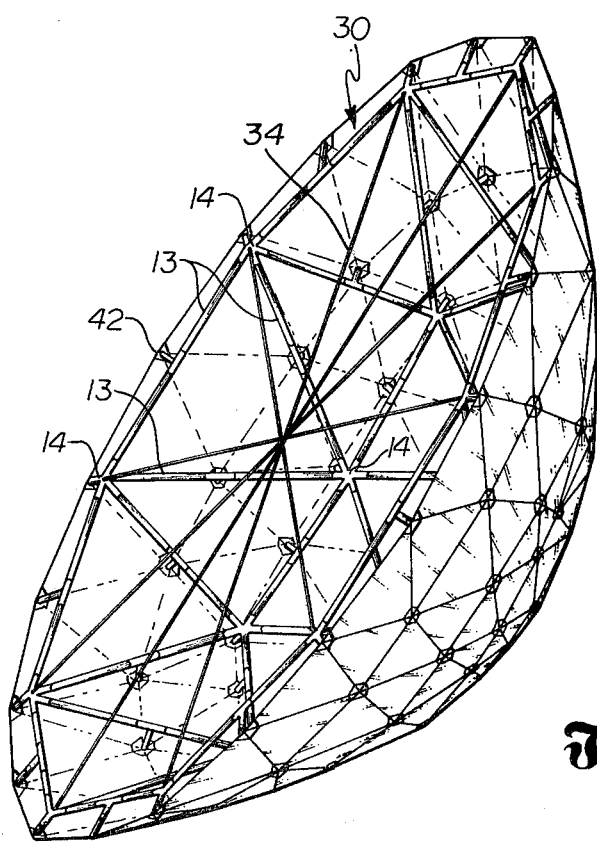
FIG. 2 is a perspective view of one embodiment of the present invention, with a single support structure.

FIG. 2 shows in more detail the parabolic reflector 10 and parabolic support matrix 12 shown in FIG. 1. Parabolic support matrix 12 comprises a plurality of elongated struts or rods 13 joined together at their ends, at joints 14, in such an arrangement as to form the parabolic support matrix shown in FIG. 2.

The arrangement of struts 13—13 form a plurality of open triangles, with each strut 13, except for those in the top row, forming one side of 2 adjacent triangles. The specific arrangement of the triangles and their relative sizes can be obtained in a number of ways, but in the instant case was achieved by projecting the lower half of a subdivided isohedron onto a true parabolic surface.

Each of the joints 14—14 lies substantially on the surface of a true parabola, while struts 13—13 extend in a straight line between joints 14—14. The upper row of struts 13—13 all lie in the same plane and form rim 30 of the support matrix, as shown in FIG. 2, while the remainder of support matrix 12 extends downward therefrom in a parabolic configuration. The individual struts 13—13 are of varying length, depending upon their location in the support matrix.

In the embodiment shown, struts 13—13 are lengths of 1½" galvanized pipe, since galvanized pipe offers relatively high strength at a low cost. Other materials, however, such as aluminum tubing, can be effectively used.

Stabilizing rim 30 are a plurality of guide wires 34 (shown in FIG. 2 but not FIG. 1) which run cross-ways of rim 30 from each joint 14 on the rim to an opposing joint on the opposite side of the rim. Hence, each joint 14 or rim 30 is connected by stiff wire, or small-diameter tubing, to an opposing joint on the rim. Guide wires 34 provide necessary support structure rigidity.

Figure 6:
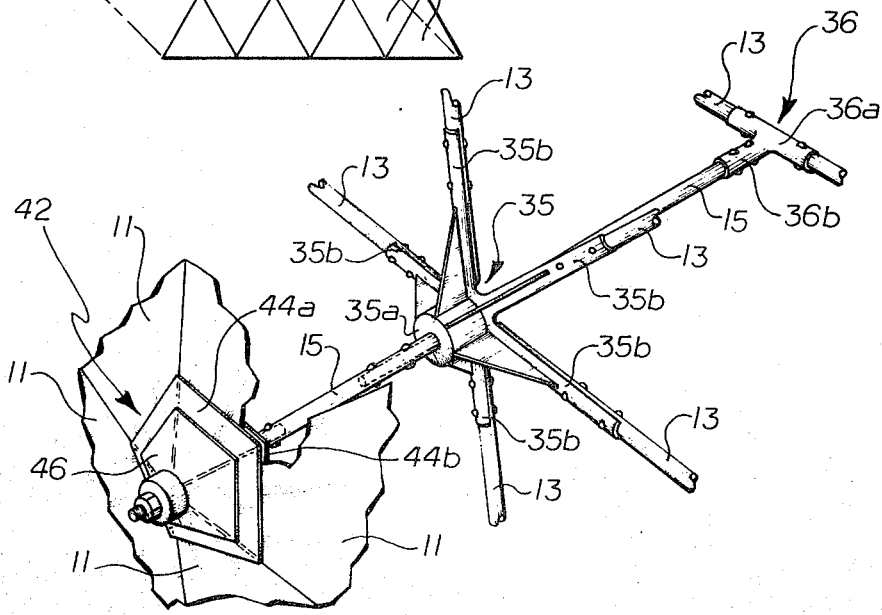
FIG. 6 is a perspective view of a standoff element, a connecting hub, and a securing member which connect the two support structures and the reflecting sections of the embodiment of FIG. 4.

The structure of the joints 14—14 is shown more clearly in FIG. 6. The construction of each joint 14 will vary depending upon its location, and whether there is more than one support matrix provided. Each joint will include a full hub or collar element which is shown generally at 35, a triangular section securing element, shown generally at 42, and a standoff element 15. When two support matrixes are used a modified hub 36 is included at each joint. A full hub 35 is used wherever the struts forming either the first or second matrixes are joined. A modified hub 36 is used for attaching a standoff element 15 to a strut 13 intermediate of its ends.

Joint 14 shown in FIG. 6 is the joint structure shown as 38 in FIG. 4. It includes a tubular T shaped modified hub 36, having a cross member 36a which is secured to a single strut 13 in the first support structure, and a base member 36b, into which one end of standoff element 15 is inserted. The modified hub 36 is positioned intermediate of the strut 13 and is used both on the first and second support structures to permit subdivision of each structural support portion.

Midway along standoff element 15 in FIG. 6 is a full hub 35 which receives the ends of various numbers of struts 13, depending upon location, in a second support matrix. Hub 35 includes a central ring 35a, through the center of which standoff element 15 extends, and a plurality of fins 35b—35b which extend radially outward from central ring 35a and which receive the ends of struts 13.

Standoff element 15 in FIG. 6 is a rod-like strut which extends perpendicularly from modified hub 36 and through full hub 35 so that it hence extends perpendicularly from a plane which is tangent to an imaginary parabolic surface connecting each joint of the parabolic support matrix.

The length of standoff element 15 depends upon the number of parabolic support matrixes used. In the embodiment of FIG. 2, for instance, only one support matrix is shown, and the length of standoff element 15 is approximately 2 inches. In the embodiment of FIG. 4, standoff element 15 might be approximately 4 inches.

Located near the end of standoff element 15 is securing element 42, which holds one apex of several triangular reflecting sections 11—11 firmly in place. Positioning element 42 of FIG. 6 comprises two relatively thin members 44a, 44b of a flexible but stiff material, such as a stiff rubber or Teflon, which, when moved close together, hold the apexes of several triangular reflecting sections 11—11 in place to form the parabolic reflector 10. When stiff members 44 and 46 are held close enough together by plate 46 and by nut and washer arrangement 45, several triangular reflecting sections 11—11 may be held firmly in position, as shown in FIGS. 6 and 8. Members 44a and 44b are sufficiently flexible, however, to permit a slight movement of reflecting sections 11—11 to take up a certain amount of environmental stresses, particularly changes in temperature, without breakage.

At no time will securing element 42, and hence reflecting sections 11—11, come into contact with the parabolic support matrix 12, and hence, no stress will be placed on reflecting sections 11—11 by the parabolic reflector structure itself.

A further key structural advantage to securing element 42 is that it may be moved a ways longitudinally along standoff element 15, permitting individual focusing of each reflecting sections 11—11 onto boiler 16. In this manner, the parabolic reflector 10 may be tuned to maximum effectiveness.

Reflecting sections 11—11 may be comprised of a number of different materials, among them being glass and polished metal, such as aluminum. It has been found, however, that the conventional double-sided mirror, silvered on the backside, is the best when both cost and reflective quality are considered. The support structure of the present invention permits the use of this relatively inexpensive material.

The reflecting sections 11—11 may be plane, which is a relatively easy and inexpensive shape to manufacture, or they may be slightly curved. If reflecting sections 11—11 are curved, the total reflecting quality of the complete parabolic reflector 10 will be better than with plane reflecting sections, and the solar collector operation will improve. The National Aeronautics and Space Administration has developed a method of fabricating curved silvered glass which is suitable for use with the present invention. It is available on microfilm under the number NTIS-N75-32894/8ST in engineering libraries of several universities, under the title "Light Weight Reflector Assembly and Method." It should be understood, however, that the present invention is capable of functioning efficiently with plane reflecting sections.

In the embodiment shown in FIG. 2, the support matrix 12 is provided inside the reflector 10. This configuration has been found to reduce the amount of reflected sunlight to the boiler by approximately 15%, which is acceptable in view of the cost savings produced in construction of large parabolic reflectors by use of the support structures disclosed herein.

Referring again to FIG. 1, the combination of parabolic reflector 10 and parabolic support matrix 12 is encircled by first and second support rings 20 and 22. Support ring 22 rides on top of support ring 20, by means of conventional rollers 26 or similar devices. Support rings 20 and 22 are substantially circular in configuration, and have diameters slightly greater than the diameter of parabolic reflector 10. In the case of a 30 foot diameter parabolic reflector, for instance, the diameter of support rings 20 and 22 is approximately 31.82 feet.

First and second support rings 20, 22 may be constructed of a variety of materials, but in the embodiment shown are aluminum tubing, approximately 4 inches thick and 9 inches wide. It should be understood, however, that rings 20 and 22 may take various configurations. They may be square or rectangular in cross-section or they may be two non-girders formed into circles.

Support ring 20 is supported off the terrain by means of a plurality of posts 24, at an angle 52 from the vertical which is equal to the latitude of the particular terrain location of the collector. Hence, the angle 52 of the support rings will vary, depending upon the latitude of the location of the apparatus.

Hence, first support ring 20 is fixedly supported by means of a plurality of support posts 24, while second support ring 22 is rotatably connected to support ring 20 by means of rollers or the like, driven by means of motor-driven gearing 31.

FIG. 7 shows in more detail the axis structure 27 by which the combination of parabolic reflector 10 and parabolic support matrix 12 is rotatably connected to support ring 22. A series of struts 60 are connected between (1) the ends of a number of standoff elements which extend from hubs 35, and (2) a common joint 62, which in turn extends into a short axle and gear arrangement 64, which controls rotation of the combination relative to first and second support rings 20 and 22. Axis structure 27 extends through reflector 10 and support matrix 12 at approximately their combined center of gravity, and hence, no counterweights are needed to stabilize the reflector during rotation.

Such an arrangement permits support matrix 12 and hence, parabolic reflector 10 as well, to follow the path of the sun as it moves across the sky. It also permits reflector support matrix 12 and reflector 10 to be rotated so that they face the terrain. Typically, a fairly rigid lightweight protective covering (not shown) may be provided over the exterior of the reflector 10 so that when the support matrix 12 and reflector 10 are rotated upside down, the protective covering is exposed to the weather. The protective covering serves to protect the reflector during extreme weather conditions, in particular, hail, dust storms, and high winds.

Figure 3:
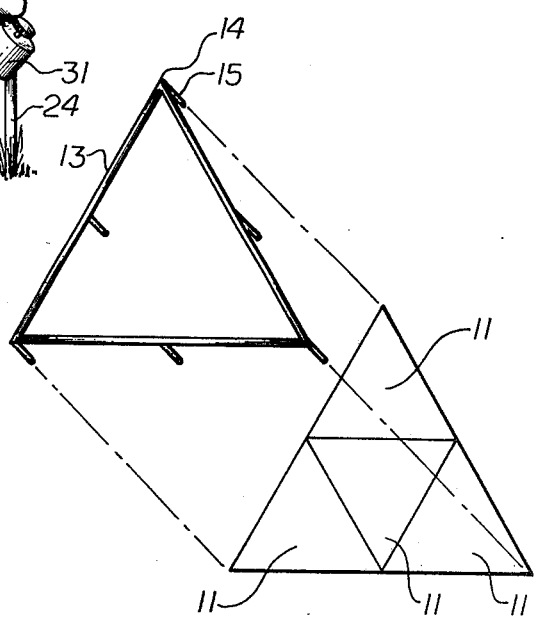
FIG. 3 is an exploded view of one portion of the embodiment of FIG. 2.
Figure 4:
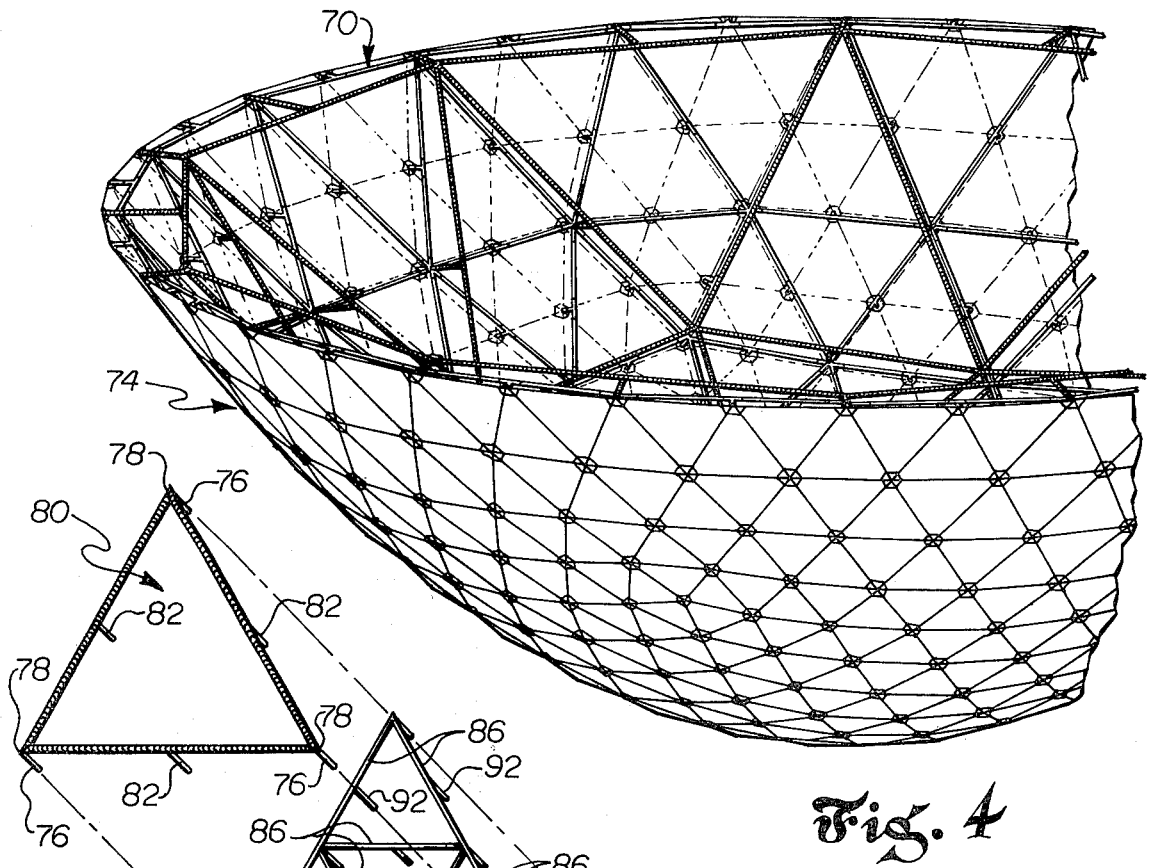
FIG. 4 is a partial perspective view of another embodiment of the present invention, with a double support structure.
Figure 5:
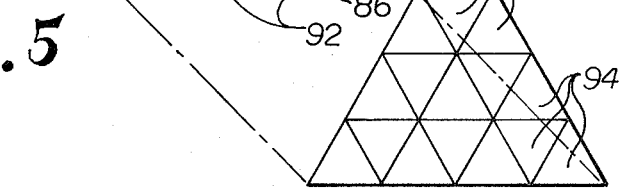
FIG. 5 is an exploded view of a portion of the embodiment of FIG. 4.

Referring now to FIGS. 4 and 5, there is shown another embodiment of the present invention which is somewhat more complicated than the embodiment of FIGS. 2 and 3. In the embodiment of FIGS. 4 and 5, an intermediate parabolic support matrix 70 is provided between a base parabolic support matrix 72 and a parabolic reflector 74. A substantial portion of the complete structure is shown in FIG. 4.

The arrangement of this embodiment is shown most clearly in FIG. 5, wherein the relationship between a single portion of the base parabolic support matrix is shown with its corresponding intermediate support matrix and corresponding reflector structure. As with the embodiment of FIGS. 2 and 3, the more complex embodiment includes a first set of standoff elements 76 located at each joint 78 of each triangular portion 80 of the base parabolic support structure, and a second set of standoff elements 82 intermediate of each pair of joints 78—78. Hubs (not shown) such as hubs 35 in FIG. 6, are located at each joint 78 while modified hubs (not shown), such as hubs 36 in FIG. 6, are used intermediate of joints 78.

The intermediate parabolic support matrix 70 comprises a plurality of struts 86 which are approximately half as long as the struts comprising base parabolic support matrix 68. Each strut 86 is connected between hubs (not shown) which are similar to hubs 35 in FIG. 6, which are positioned on standoff elements 76 and 82, as shown in FIG. 5. This results in a four triangle section of intermediate support matrix for each portion 80 of base support matrix. Struts 86 may be lighter in weight than those struts comprising the base parabolic support matrix. For example, struts having a diameter of ½ inch and a wall thickness of 1/16th inch have been found to be useful for a 30 foot diameter reflector. In addition to standoff elements 78 and 82 which extend through the hubs which support struts 86, further standoff elements 92 are provided, located intermediate each strut 86 and connected thereto by a modified hub (not shown) similar to hub 36 shown in FIG. 6.

At the end of standoff elements 78, 82 and 92, a securing element (not shown) similar to element 42 in FIG. 6 is provided to hold the reflecting sections which fit together to comprise the parabolic reflector 10.

Because standoff elements 78, 82 and 92 all support individual reflecting sections 94—94, there are four reflecting sections for each intermediate support matrix section, and hence sixteen reflecting sections for each portion 80 of the base support matrix 72. This arrangement is shown most clearly in FIG. 5. In the embodiment of FIG. 4, which was developed by projecting a subdivided isohedron onto a parabolic surface, there are 40 triangular shaped portions which comprise the base parabolic support matrix. Hence, a total of 640 reflecting sections will comprise the parabolic reflector 10.

The support structure described above is advantageous, as it has sufficient strength to support the reflecting sections, and to take up environmental stress, so as to minimize possible damage to the reflecting sections. In addition, such a structure permits the reflecting sections to be individually focused on to a boiler, increasing the potential efficiency of the reflector. In the arrangement shown above, each reflecting section reflects substantially the same amount of light to the boiler when the reflector is properly oriented with respect to the sun.

The above-described support structure permits, in practical terms, the use of plane triangles to construct a large-dimension parabolic reflector. Such a complete structure can be used advantageously in solar collection systems. The support structure is relatively inexpensive, as it can be made from commercially available, relatively inexpensive, materials, and can be assembled quickly and easily on site. It has extremely high strength, and can protect the reflector structure against weather extremes, particularly high winds and hail, without blocking a substantial amount of light from the reflector.

Although a preferred embodiment of the invention has been disclosed for purposes of explanation, it should be understood that various changes, and modifications can be made to the embodiment shown without departing from the spirit of the invention. It should be understood, for instance, that although the support matrix is shown as being interior of the reflecting sections, the same principles could be used to provide an exterior support matrix. Additionally, it should be understood that the particular hub configuration shown is not critical. Various configurations may be successfully used. The invention is defined by the claims, which follow.

What is claimed is:

1. A support structure for a large-dimension parabolic reflector which comprises a plurality of rigid triangular reflecting members relatively small in size compared to the size of the entire reflector, said support structure comprising:

a first rigid support matrix comprising a plurality of strut-like members joined together at matrix points to form a plurality of triangular sections arranged in a parabolic configuration, terminating at a rim which lies completely in a single plane;

a first plurality of standoff elements, connected at said matrix points and points intermediate said matrix points, such that the area of each triangular section of said first rigid matrix includes at least four triangular reflecting members of substantially equal size, said standoff elements extending away from said first support matrix; and means mounted on said standoff elements for securing said triangular reflecting elements in position away from said first support matrix.

2. An apparatus of claim 1, wherein said reflector is substantially equidistant from said first support matrix over its entire surface.

3. An apparatus of claim 1, wherein said securing means is movable along said standoff element so as to permit focusing of the reflecting members.

4. An apparatus of claim 3, wherein said securing means are sufficiently flexible to permit slight movement of the reflecting members without damage to the reflecting members.

5. An apparatus of claim 1, wherein an imaginary curved continuous surface connecting said matrix joints is a parabola and wherein said standoff elements extend outwardly from said first support matrix at said matrix joints perpendicular to a plane which is tangent to said continuous surface at said matrix joints.

6. An apparatus of claim 5, wherein said standoff elements are of sufficient length and there is sufficient distance between said first support matrix and said securing means so as to prevent contact between said strut-like members and the reflecting members.

7. An apparatus of claim 1, including a second rigid support matrix which comprises a plurality of strut-like members jointed together to form a plurality of triangular sections which approximate the configuration of the curved surface, wherein said second support matrix is slightly larger in configuration than said first support matrix and is positioned between said first support matrix and the reflector.

8. An apparatus of claim 7, wherein said standoff elements are connected at each matrix joint of said first and second support matrixes and at points intermediate the ends of each strut-like member in said first and second matrixes and wherein securing means are provided on each standoff element, such that the area of each triangular section of said first support matrix includes four triangular sections of said second support matrix, and wherein the area of each triangular section of said second support matrix includes four triangular reflecting members.

9. An apparatus of claim 1, including a tracking support means supporting said first support matrix for tracking the path of the sun.

10. An apparatus of claim 9, including means for following the azimuth of the sun with said first support matrix and means for following the altitude of the sun with said first support matrix.

11. An apparatus of claim 10, wherein said means for following the azimuth of the sun includes first and second tracking members, said first tracking member being supported stationary in a predetermined angular position relative to the ground and said second tracking member being supported parallel to said first tracking support member, and being connected to said first support matrix, and further includes means for rotating said second tracking member relative to the first tracking member, so that the second support member may be rotated in order for said first support matrix to follow the azimuth of the sun.

12. An apparatus of claim 11, wherein said means for following the altitude of the sun including axis means rotatably connecting said first support matrix to said second tracking member in a plane substantially perpendicular to the plane of rotation of said second tracking member, so that said first support matrix may be rotated to follow the altitude of the sun.

13. An apparatus of claim 12, wherein an imaginary straight line connecting the axis means on opposite sides of said first support matrix extends substantially through the center of gravity of said first support matrix.

* * * * *